United States Patent
Raj (10) Patent No.: US 11,738,842 B2
(45) Date of Patent: Aug. 29, 2023

(54) PROCESS FOR MAXIMIZING SPEED OF MARINE VESSELS PROPELLED BY NATURAL RENEWABLE ENERGY BY MANAGING THE HARVESTING, STORAGE AND RE-USE OF NATURAL ENERGY

(71) Applicant: Anil Raj, New Orleans, LA (US)

(72) Inventor: Anil Raj, New Orleans, LA (US)

( * ) Notice: Subject to any disclaimer, the term of this patent is extended or adjusted under 35 U.S.C. 154(b) by 0 days.

(21) Appl. No.: 17/471,700

(22) Filed: Sep. 10, 2021

(65) Prior Publication Data
US 2022/0242539 A1 Aug. 4, 2022

Related U.S. Application Data

(63) Continuation of application No. 16/376,141, filed on Apr. 5, 2019, now abandoned.

(51) Int. Cl.
| | |
|---|---|
| *B63H 21/20* | (2006.01) |
| *B63H 13/00* | (2006.01) |
| *B63H 21/17* | (2006.01) |
| *B63H 19/02* | (2006.01) |
| *B63H 9/04* | (2020.01) |

(52) U.S. Cl.
CPC ............ *B63H 21/20* (2013.01); *B63H 13/00* (2013.01); *B63H 19/02* (2013.01); *B63H 21/17* (2013.01); *B63H 9/04* (2013.01); *B63H 2021/171* (2013.01)

(58) Field of Classification Search
CPC ........ B63H 21/20; B63H 13/00; B63H 19/02; B63H 21/17; B63H 9/04
See application file for complete search history.

(56) References Cited

U.S. PATENT DOCUMENTS

| | | | |
|---|---|---|---|
| 4,102,291 A | 7/1978 | Sebald | |
| 4,369,630 A | 1/1983 | Bloomfield | |
| 4,582,013 A * | 4/1986 | Holland, Jr. ............ | B63H 9/02 416/4 |
| 6,107,691 A | 8/2000 | Gore et al. | |
| 6,329,725 B1 | 12/2001 | Woodall et al. | |
| 7,789,723 B2 * | 9/2010 | Dane ..................... | B63G 8/001 114/39.21 |
| 8,123,577 B2 * | 2/2012 | Riggs .................... | H01M 12/06 440/6 |

(Continued)

*Primary Examiner* — S. Joseph Morano
*Assistant Examiner* — Jovon E Hayes
(74) *Attorney, Agent, or Firm* — Intellectual Property Consulting, LLC; Mark Melasky (57) ABSTRACT

A marine vessel can be propelled by using wind or solar energy. This propulsion results in the forward movement and six degrees of motion (roll, heave, pitch, yaw, surge, and sway) of the marine vessel. This invention capitalizes on the fact that solar, wind and wave energy are cyclical by nature. The invention enables the vessel to manage stored and harvested energy and use the stored energy during periods when the external natural sources of energy are not available in adequate quantities to maintain a reasonable speed of advance for the vessel. The vessel's natural energy management system (NEMS) manages it in such a way that harvesting of the energy during high energy cycles, storing it and using it when needed during low external energy cycles, allows a marine vessel to maintain faster average speed without reliance on any fossil or chemical fuel and by only using renewable energy sources.

10 Claims, 10 Drawing Sheets

(56) References Cited

U.S. PATENT DOCUMENTS

| | | | |
|---|---|---|---|
| 8,174,135 B1* | 5/2012 | Roe | F03D 5/04 |
| | | | 290/43 |
| 8,230,798 B2 | 7/2012 | Rohden | |
| 9,163,607 B2* | 10/2015 | Tabe | F03D 9/25 |
| 2007/0077830 A1 | 4/2007 | Rzadki et al. | |
| 2008/0272605 A1 | 11/2008 | Borden et al. | |
| 2009/0217851 A1* | 9/2009 | Kind | B63H 9/02 |
| | | | 416/4 |
| 2010/0221962 A1 | 9/2010 | Su | |
| 2011/0101692 A1* | 5/2011 | Bilaniuk | F03D 13/20 |
| | | | 290/55 |
| 2011/0204641 A1 | 8/2011 | Corradini | |
| 2011/0281478 A1 | 11/2011 | Blumenthal | |
| 2012/0289103 A1* | 11/2012 | Hudson | F42B 19/06 |
| | | | 290/1 R |
| 2014/0042975 A1* | 2/2014 | Miller | H01M 6/5033 |
| | | | 320/137 |
| 2015/0027125 A1* | 1/2015 | Raj | F03D 1/0616 |
| | | | 60/720 |
| 2018/0245564 A1* | 8/2018 | Sheldon-Coulson | F03B 13/18 |
| 2019/0016419 A1* | 1/2019 | Sheldon-Coulson | B63H 21/00 |

* cited by examiner

PROCESS FOR MAXIMIZING SPEED OF MARINE VESSELS PROPELLED BY NATURAL RENEWABLE ENERGY BY MANAGING THE HARVESTING, STORAGE AND RE-USE OF NATURAL ENERGY

CROSS-REFERENCE TO RELATED APPLICATIONS

This application is a continuation of U.S. patent application Ser. No. 16/376,141, filed Apr. 5, 2019, the entirety of which is incorporated by reference as if fully disclosed herein.

BACKGROUND OF THE INVENTION

Field of the Invention

Embodiments of the present invention relate to maximizing the speed of marine vessels propelled by natural energy. The invention manages the marine vessel's energy collection and spending processes to harvest and store natural energy and expend it in a managed process to attain maximized speed over a course and provide unlimited autonomy. This harvesting, storing and expending energy management process uses energy gathered from the sun, the wind, and the movement of the vessel.

General Background

Marine vessels have sailed using the wind as the primary source of energy longer than written history has been recorded. However, the management of harvested and stored natural energy captured from the forward motion of the vessel, solar panels and kinetic energy from six degree of freedom motions of the vessel for the purpose of increasing the vessels speed over a course is a new concept. Similarly, solar panels have been used to generate and store energy for a variety of land based and marine applications but the inclusion of these in this energy management process is also a new concept. The vessel, when moving forward in waves, picks up six degree of freedom motions. These are called Pitch, Roll, Yaw, Surge, Sway and Heave. These motions, or excitations, of the vessel from the waves impart energy into the marine vessel's hull. Devices have been developed to recover some of this energy from such movements to generate power, however, the channeling and management of this energy for the purpose of harvesting, storing and using it to increase the speed of the vessel has not been done before. Marine vessels, whose forward movement is propelled by the wind, use heavy dense material as ballast in the bottom of the vessel to maintain the stability of the vessel as the forces from the sails threaten to overturn the vessel. Historically, lead cannon shots and other dense weight materials such as concrete with iron in it have been used to keep such vessels upright and stable. This is called "ballast". Excessive ballast allows maximum sail area to provide maximum propulsion energy from wind of this nature making the marine vessel heavier and reducing its cargo carrying capacity. Marine vessels can also use heavy electrical energy storage devices, such as energy storing batteries, in lieu of ballast, which allows for more stability and allows the vessel to use maximum wind energy as it stays safely upright. This same ballast which also functions to store properly managed energy to increase the speed of the vessel over a long distance in conjunction with the natural energy management system is a new concept.

REFERENCES CITED

US patent 20110281478, Benjamin Blumenthal, "Systems, Devices and Methods for Providing Energy for Ship Propulsion", issued 2011 Nov. 17.

US patent 20110204641, Martin Corrudini, "Hydroelectric Turbine Based Power-Generating System for Vessels and Submarines", issued 2011 Aug. 25.

US patent 20080272605, Robert M. Borden and Wendell M. Smith, "Wind Power System", issued 2008 Nov. 6.

U.S. Pat. No. 6,329,725, Robert M. Woodall and Philip J. Grossweiler, "Systems and Methods for Utilizing Excess Electric Power from a Marine Transportation Vessel", issued 2001 Dec. 11.

U.S. Pat. No. 6,107,691, Gerald E. Gore, Wayne K. Wittman, Harry T. Roman, Robert A. Gore, Michael D. Gore, Methods for Utilizing the Electrical and Non Electrical Outputs of Fuel Cell Powered Vehicles", issued 2000 Aug. 22.

U.S. Pat. No. 4,102,291, Ralph Sebald, "Electrical Generator for a Sailboat", issued 1978 Aug. 25.

US patent 20070077830, Wolfgang Rzadki, Matthias Schulze, Ronald Volzke, Bernd Wacker, "Power Generation, Distribution and On-Board Power Supply System for Low-Emissive Surface Marine (Navy) Ships of Different Classes and Sizes", issued 2007 Apr. 5.

US patent 20100221962, Jiin Juh Su, "Fuel Efficient Power System for Electric Boat", issued 2010 Sep. 2.

U.S. Pat. No. 4,369,630, Warren Bloomfield, "Combination Drive System for Ships", issued 1983 Jan. 5.

U.S. Pat. No. 8,230,798, Rolf Rohden, "Magnus Rotor", issued 2012 Jul. 31.

SUMMARY OF THE INVENTION

The present invention is a method for managing the harvesting of nature's wind, wave and solar energy into electrical power on a marine vessel for storage onboard and use when the propulsion power from external natural energy cycles is low. This invention capitalizes on the fact that availability of solar, wind, and wave energy are time-cyclical in nature. The management process in this invention uses the harvested and stored energy to enhance the marine vessel's propulsion speed during cycles when external natural energy sources are not adequately available, with the ultimate result that the average speed of the vessel over a voyage is maximized. The invention depends on the technical fact that the speed versus power curve of a marine vessel is much steeper at the higher speed range and flatter at the lower speed range (see FIG. 1). It can be seen in this curve that when the vessel's speed is high, due to higher winds for example, if the vessel goes into "harvesting" mode, the loss of speed 14 is relatively low, while the corresponding rate of energy harvested is high 9. This allows harvesting of relatively large amounts of energy 9 with a minimal compromise in the vessel's speed 14. It can also be seen in this curve that when the vessel is moving slowly because winds and other external sources of energy like solar are low, the vessel's speed can be increased significantly 13 by expending relatively little energy 10. Therefore, harvesting energy, when the external natural energy cycles, like wind or sun are high causing higher vessel speeds, allows for the collection of large amounts of corresponding energy 9 compromising only small amounts of speed 14. Similarly, when the vessel speed is low because of low external wind speed or solar energy, the stored energy is used to provide significant increases in propulsive speed 13 to the vessel allowing the average vessel speed over a range to be significantly increased. Because the speed versus power curve is relatively flat at lower vessel speeds, relatively less stored energy is expended 10 with corresponding significant higher speed increases 13. This results in a significant increase of average speed gain over the length of the vessel's voyage. The vessel may be normally propelled using wind energy from canvas or foil sails or single or multiple Flettner rotors being called propulsion wind energy sources. Similarly, the vessel may be propelled using solar energy sources, when solar energy is high. The vessel may also be powered by a combination of solar and wind. Propulsion power created by the wind or solar propulsion energy sources captures and uses the energy to propel the marine vessel. In this invention, the vessel manages the harvesting and storage of a part of this external energy as electric power in the form of the fuel cells or by recharging batteries using one or more regenerative propellers and a motor system acting as hydraulic turbines. Additional electrical energy is similarly also harvested from wave generated motions of the marine vessel's hull. Electric energy produced by these means are managed by an energy storage and management process. This process manages the excess power harvested by the vessel's energy and is deposited to a storage system to be used later upon demand by the vessel's energy management system. When wind speeds or solar energy cycles are low resulting in lower vessel speeds from external energy sources, the process applies stored power to increase the vessel speed by using the propulsion motors, also known as propelling the vessel in "motor sailing" mode. When the vessel is in "motor sailing" mode it will use the stored energy to create supplemental propulsion power by using the regenerative motors in the "propulsion mode" providing power to the propeller(s) to increase the vessel speed in order to maximize the average speed over the length of the voyage.

The object of the invention is to apply a natural energy management system (NEMS) to provide maximized propulsion speed to marine vessels by the combined use of naturally available energy and the use of harvested, stored and expended energy. This energy is harvested and stored during high external energy time-cycles (whether from wind, sun, or waves) and expended during low external energy time-cycles. The vessel may be a commercial marine transport vessel, a pleasure yacht, a research vessel, or autonomous surface or submarine vessel used by Naval Forces. Such a vessel can be propelled without the use of any fossil, chemical or radioactive fuel, while maintaining maximum possible speed over a long voyage. Energy is harvested from the wind, sun, or the motion of the vessel as means of propelling the vessel and a means of harvesting and storing some of the energy, properly managed and controlled by the process which is the heart of this invention. This process permits the creation of a zero-emission marine vessel with unlimited endurance and a commercially acceptable speed of advance. For naval autonomous vessels, such an invention extends the endurance.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

REFERENCE NUMERALS IN THE DRAWINGS

1 Disc attached on the top of each rotor
2 Flettner rotors (which act as mechanical 'sails')
3 Solar panels
4 Hull
5 Regenerative propellers
6 Battery bank
7 Electric motor/generator
8 Water flow causing power generation to charge batteries
9 Energy harvest storage rate
10 Stored energy depletion rate supplementing speed
11 Canvas or foil sail
12 Flettner electric motor
13 Speed gain from use of stored energy
14 Speed loss in energy harvest mode
15 Magnetic levitation of rotors to reduce friction

DETAILED DESCRIPTION

The embodiments of the disclosure will be best understood by reference to the drawings, wherein like parts are designated by like numerals throughout. It will be readily understood that the components, as generally described and illustrated in the Figures herein, could be arranged and designed in a wide variety of different configurations or be entirely separate. Thus, the following more detailed description of the embodiments of the system and method of the disclosure, as represented in the Figures is not intended to limit the scope of the disclosure, as claimed, but is merely representative of possible embodiments of the disclosure.

Figure 1:
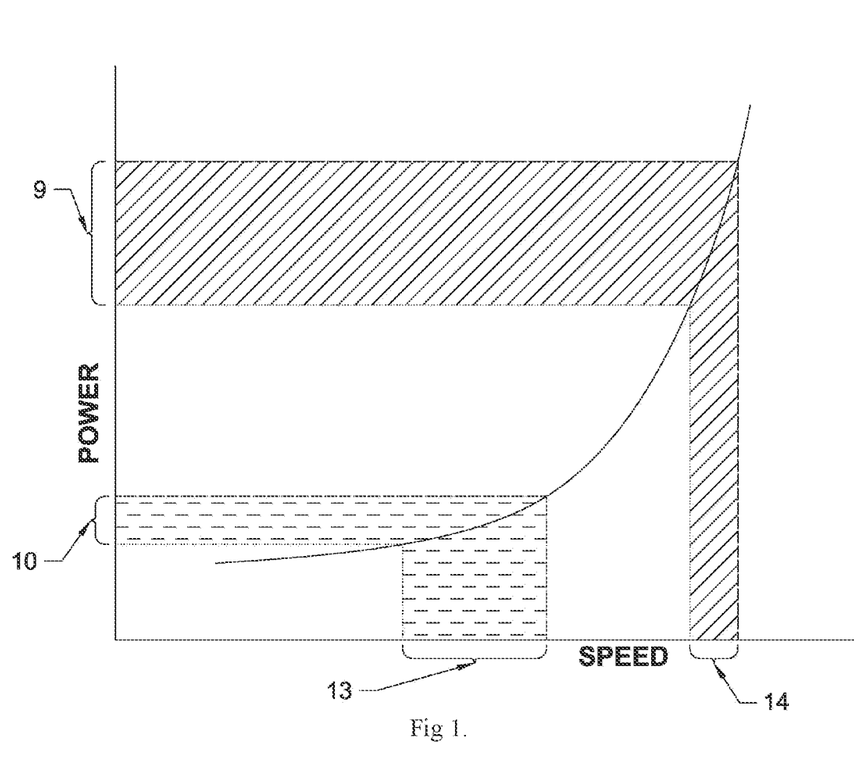
FIG. 1 is a typical Speed/Power curve of the marine vessel which forms the basis of the present invention.
Figure 2:
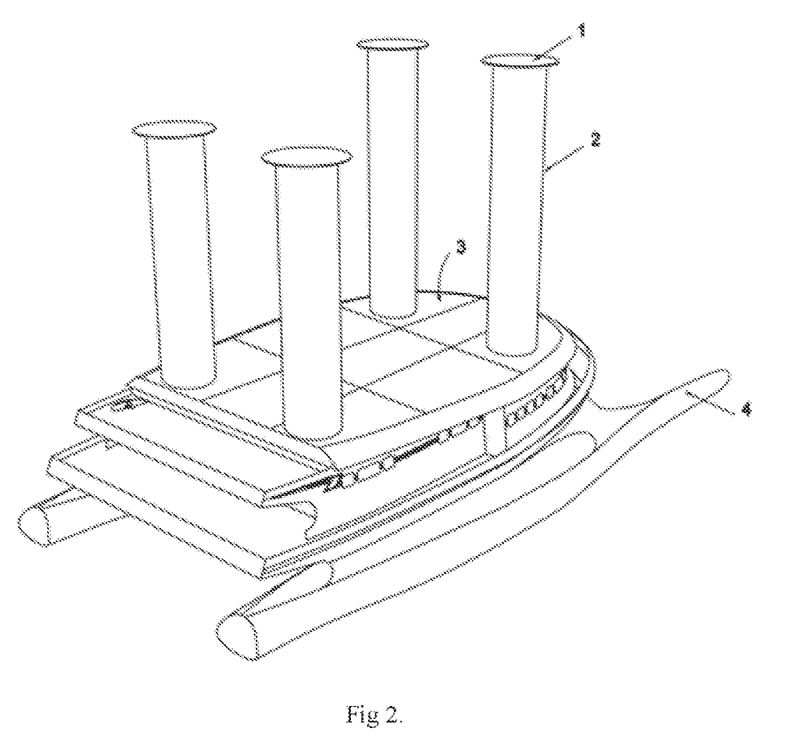
FIG. 2 is a perspective view of one type of marine vessel (twin hull vessel with Flettner rotors and solar panels) using the present invention.
Figure 3:
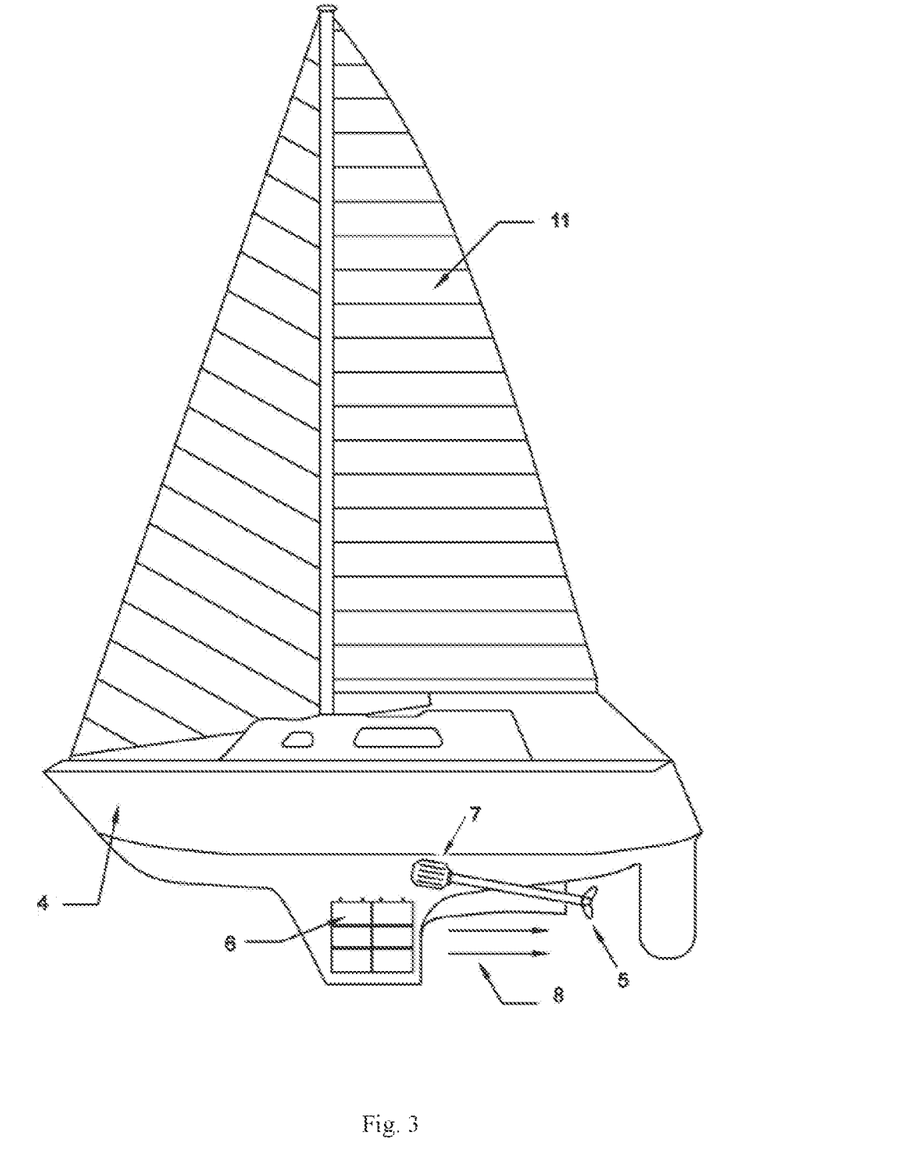
FIG. 3 is a perspective view of a common sailboat which can also use the present invention.
Figure 4:
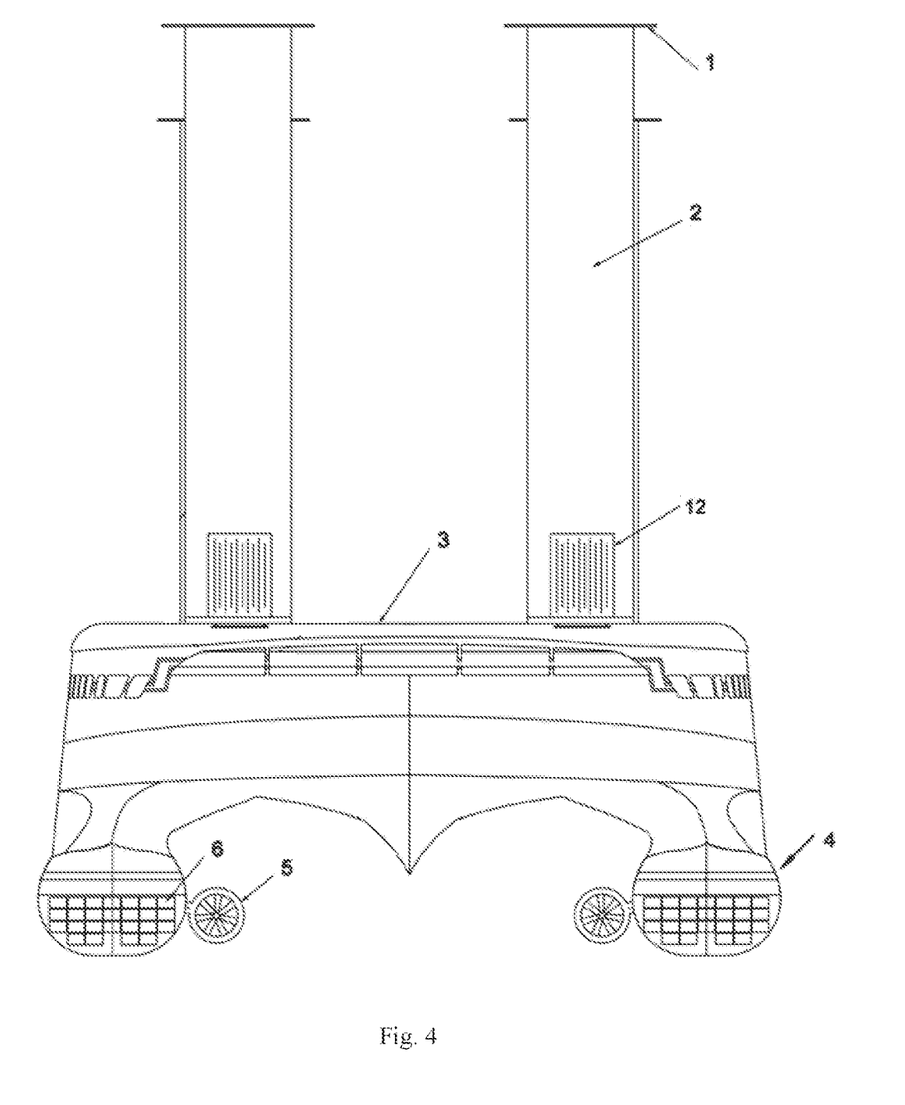
FIG. 4 is a front view of a twin hull vessel which can use the present invention.
Figure 5:
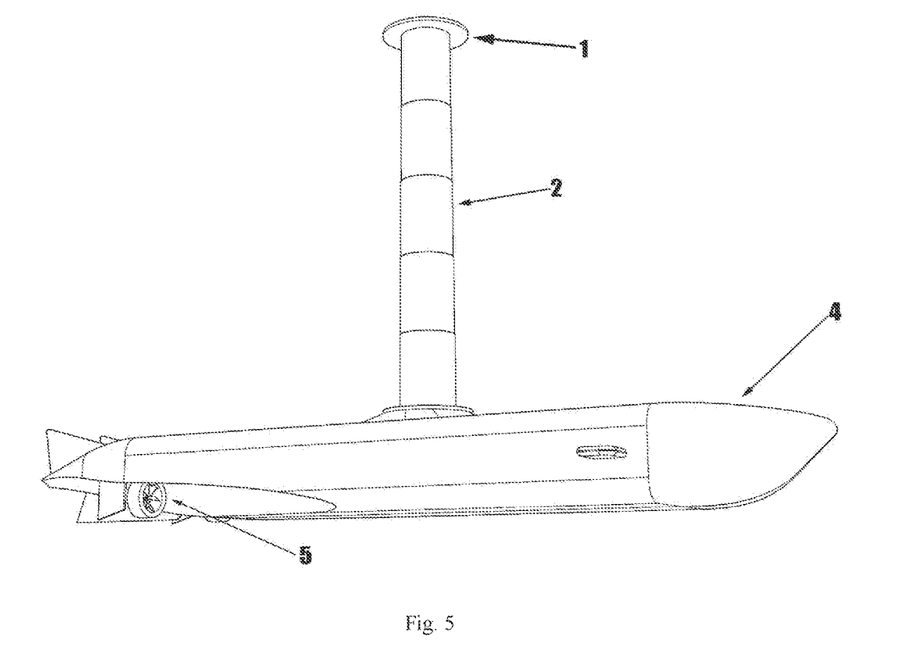
FIG. 5 is an image of a naval autonomous underwater vehicle (AUV) which can use retractable Flettner rotors 2 and regenerative propellers 5 to gain extended autonomy using the present invention.
Figure 6:
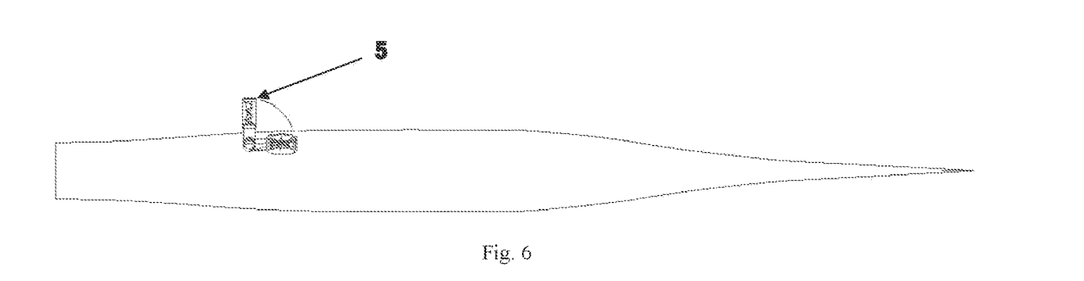
FIG. 6 is a top view of a single hull of a marine vessel in FIG. 2 of the present invention with retractable regenerative propellers, which can be used to harvest energy underway, and propel the vessel during low energy cycles.

FIG. 2 and FIG. 4, show a twin hull marine vessel with four vertical Flettner rotors 2, to which a disc 1 is attached on the top of each rotor. These Flettner rotors 2 are used as means of a propulsion force using the Magnus principle to push the marine vessel's hull 4 forward in the water in a desired direction, much like the way a sail acts as a driving force on a sailboat FIG. 3. To harvest energy from the forward motion of the vessel, and to propel the vessel when needed, regenerative propellers 5 are located on the side of each hull of the multi hull vessel FIG. 4 or under a mono hull FIG. 3 to harvest energy from the flowing water 8, like a hydraulic turbine, when the marine vessel's hull 4 is in forward motion due to the driving force from the wind. Solar panels augment the energy produced for vessel's use. The combined excess energy is channeled by a natural energy management system (NEMS) into an energy storage device such as a battery bank 6, or fuel cells located at the bottom of the marine vessel near the keel. The dense batteries or energy storage device 6 close to the keel also serves to lower the center of gravity of the marine vessel, increasing the marine vessel's stability and safety, and also allowing for maximum energy harvesting from wind for faster propulsion and thus increasing the ability to harvest energy from the flowing water. Each regenerative propeller 5 can also provide propulsion to the vessel during low external energy cycles through a regenerative motor. The energy management system does this when the benefits of winds and sun are low and energy harvesting is impractical FIG. 1. The same propellers 5 attached to the same regenerative motor harvest energy for storage with the motor in regenerative mode, when the winds are high.

In more detail, still referring to the invention of FIG. 2 and FIG. 3, Flettner rotors 2 will create a driving force using the Magnus Effect, a phenomenon occurring when a spherical or cylindrical object rotates in a flowing fluid stream 8, resulting in a lifting force on the object perpendicular to the fluid-flow. Hence, the Flettner rotors 2 create the same effect as a canvas sail or foil sail 11 would on a vessel FIG. 3, but with a larger range of control.

The regenerative propellers 5 can be propulsion thrusters such as Rim Driven Thrusters which do not have hubs or axial shafts at the center which help reduce additional drag either in driving or in driven mode or other types of propellers that can act as turbines in the regeneration mode. The regenerative propellers 5 work like turbines when placed in a stream of water. The forward motion of the marine vessel's hull 4 with respect to the water creates the said stream of water, thus driving a propulsion device in a hydraulic energy gathering mode such as the regenerative propeller 5 which produces electricity. A standard propeller properly designed for such function on a common sailboat FIG. 2, would have the same effect.

In the example of FIG. 2 and FIG. 4, Solar panels 3 are positioned on the upper deck and cover most of the vessel's surface area exposed to sunlight, producing additional energy for harvesting which is stored in the battery bank 6.

Figure 7:
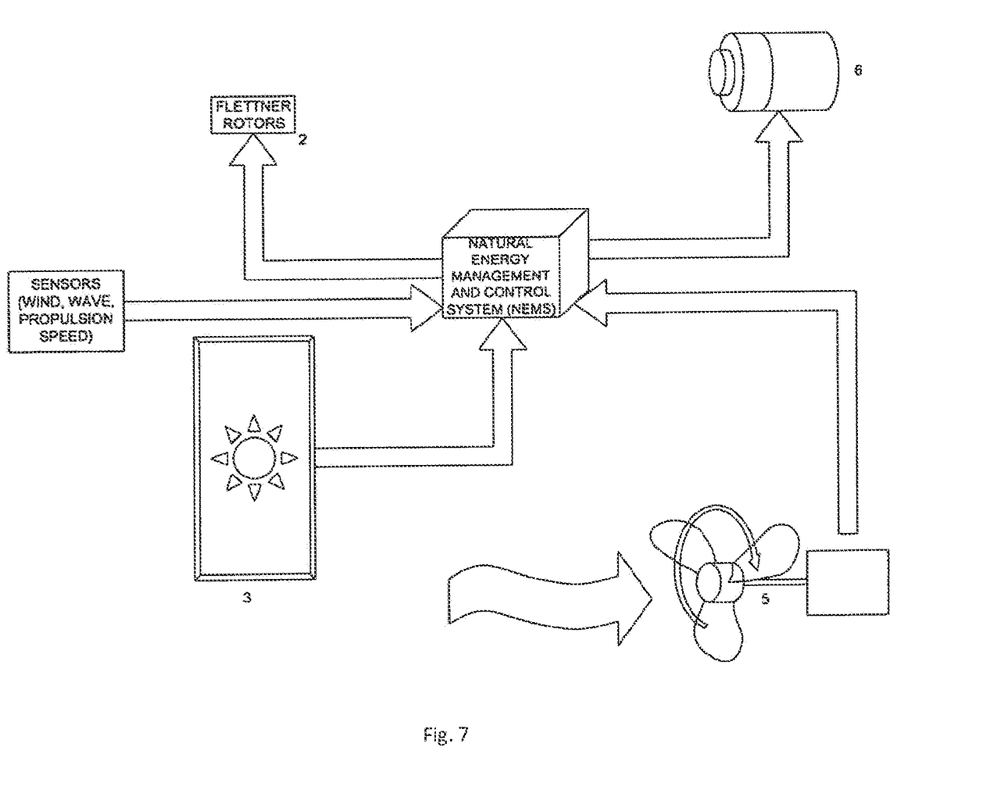
FIG. 7 is an energy flow diagram of harvesting of energy during high natural energy available cycles.

In more detail, referring to the application of this invention in FIG. 7, during suitable wind speeds and when energy harvesting is ideal FIG. 1, electric energy is stored in the batteries 6 and flows to the natural energy management system (NEMS); it is directed to the motors 12 in the Flettner rotors 2 ensuing their controllable rotational speeds and through the Magnus Effect, results in the forward motion of the marine vessel's hull 4.

The forward motion of the marine vessel's hull 4 allows the water to flow 8 through the energy harvesting regenerative propellers 5 causing them to rotate and drive the motor in a generation mode to produce electricity. The electrical energy produced by the regenerative propellers 5 and the solar panels 3 is collected by the natural energy management system (NEMS) and is fed back to the battery bank 6.

Figure 8:
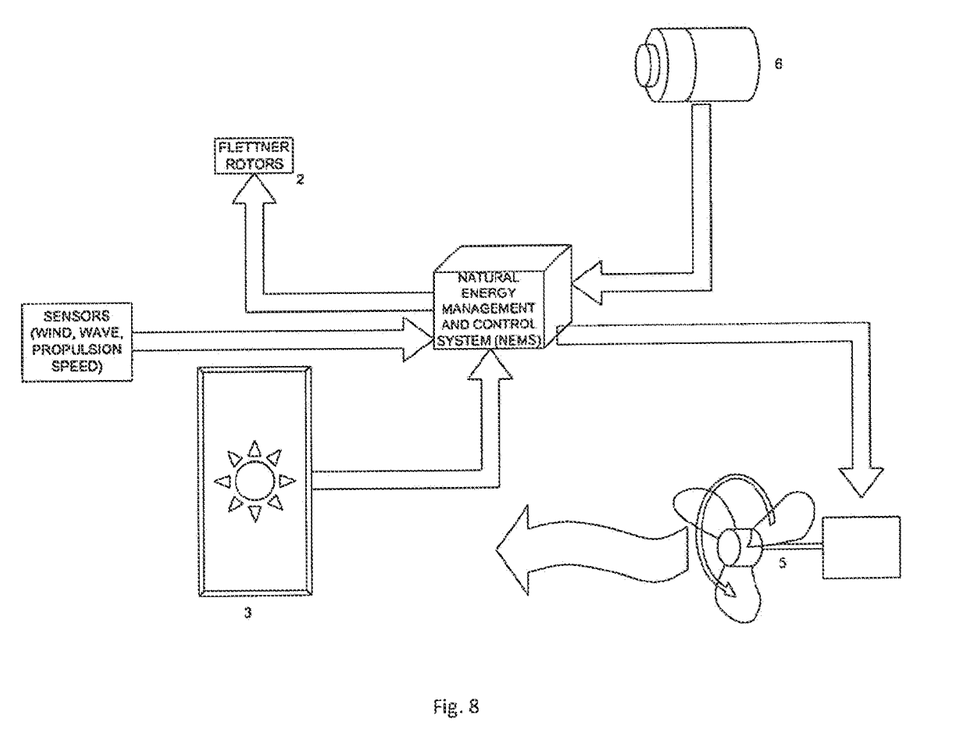
FIG. 8 is an energy flow diagram of expending harvested energy during low natural energy available cycles.

Referring to the invention in FIG. 8, during unsuitable wind speeds and when energy harvesting is impractical FIG. 1, electric energy stored in the batteries 6 is managed by the natural energy management system (NEMS); it is then directed to the regenerative propellers 5. The driving thrust produced by the propellers, when added to any thrust being provided by the rotors 2 due to the wind, will combine to give higher speeds to the marine vessel's hull 4.

Excess electric energy produced is directed to a natural energy management system (NEMS) which then stores it in a battery bank 6 located at the lowest space of the hull FIG. 4. This configuration will provide a low center of gravity and improved vessel stability. Batteries 6 are modular and are stored in a cellular grid where they can be easily accessed for maintenance and replacement. The charge and discharge cycles are monitored by the EMS to increase battery life time.

Figure 9:
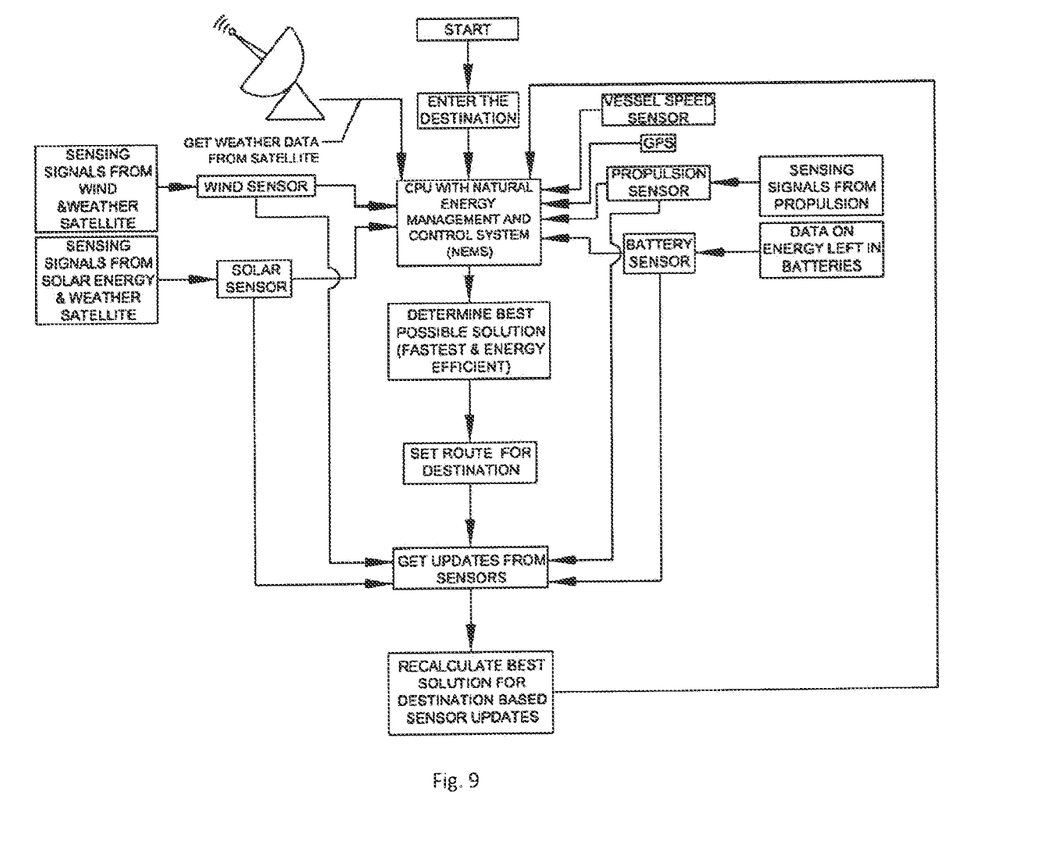
FIG. 9 is process flow chart for the harvesting, storing and utilization of harvested natural energy.
Figure 10:
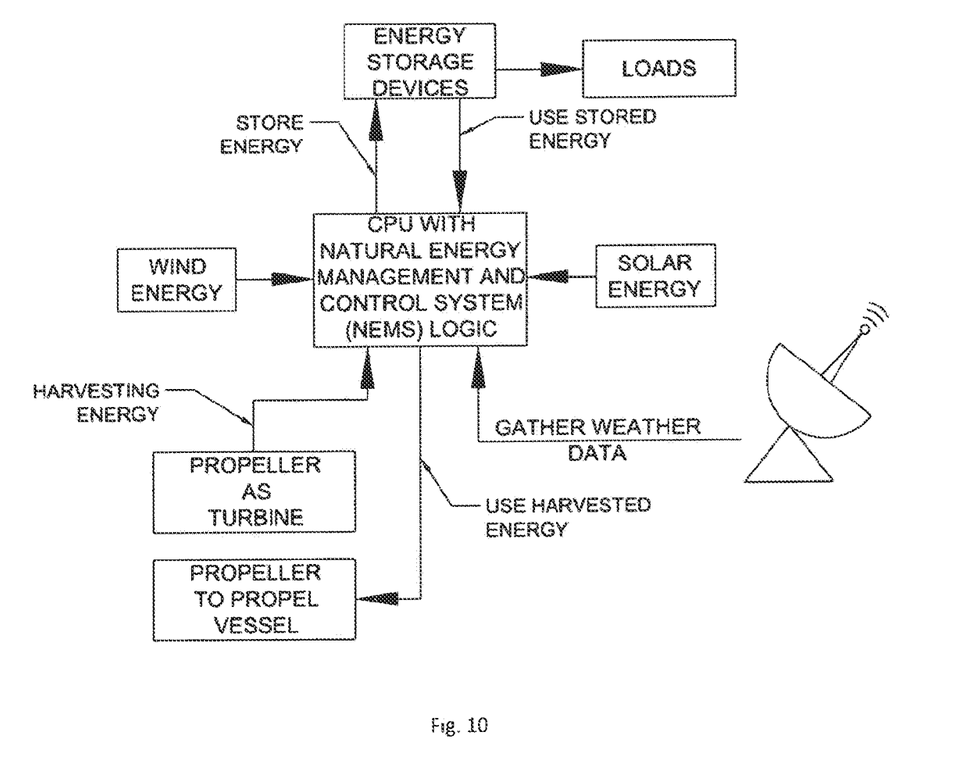
FIG. 10 is Natural Energy Management System (NEMS) Central Processing Unit that links different sources of power generators and power consumers.

FIG. 9 and FIG. 10 show the logic involved in the decision making further complemented by real time weather data obtained from the satellite or internet. If the weather is favorable, the vessel is operated in regeneration model where energy is harvested, however if the weather is not favorable stored energy is used to increase the vessel speed.

Figure 11:
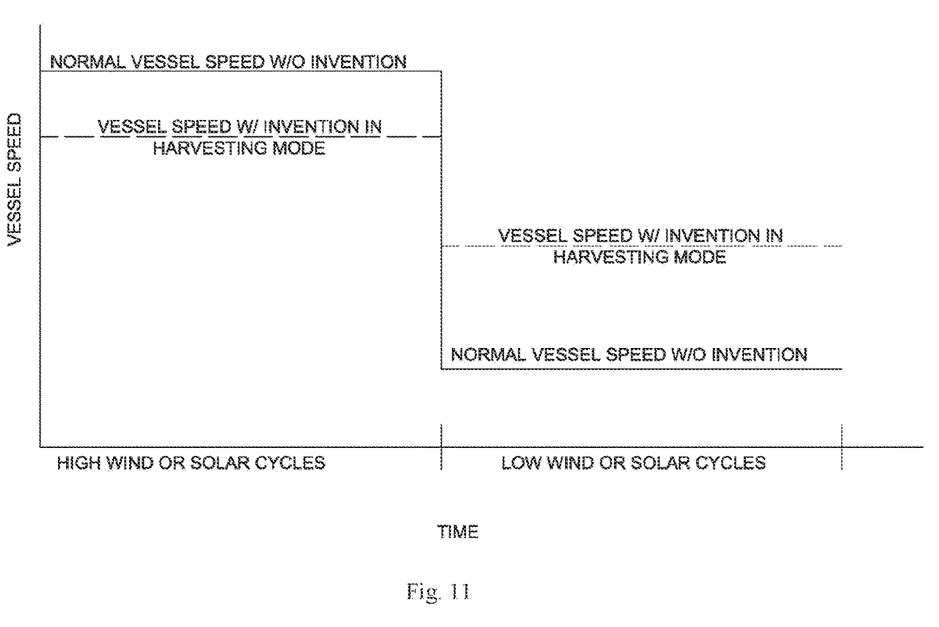
FIG. 11 is a graphical representation of vessel operation during varying wind or solar cycles.

Also, FIG. 11 shows varying wind and solar cycles respectively. When there is high wind, the vessel is moved forward by the Flettner rotors and the propeller is used to regenerate power which charges the batteries. During the low wind cycles, the stored energy is used to increase vessel speed. This process repeated will result in an overall increase in forward vessel speed. A similar process is applied to the solar cycles (day or night/sunny or cloudy) to improve vessel overall speed depending on energy storage and energy expenditure. The only difference is there is no speed reduction during power generation as the energy is produced by solar panels.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A process of harvesting, storing, and reusing natural energy in a marine vessel, comprising:
    (a) providing a marine vessel, comprising:
        a hull;
        an energy storage bank;
        at least one solar panel;
        at least one propeller;
        a plurality of Flettner rotors;
        a plurality of sensors for detecting natural energy sources;
        a processor and associated memory;
    (b) measuring, by operation of said plurality of sensors, at least one natural energy source;
    (c) calculating, by operation of said processor and associated memory, whether said at least one natural energy source measured by said at least one sensor is at a high cycle or a low cycle;
    (d) harvesting, by said solar panel and by said propeller, said natural energy if said natural energy source is at a high cycle calculated in step (c) and storing said natural energy in said energy storage bank;
    (e) expending, by said propeller, a natural energy stored in said energy storage bank if said natural energy source is at a low cycle calculated in step (c); and
    (f) calculating, by operation of said processor and associated memory, a rotational speed of each Flettner rotor of said plurality of Flettner rotors to maximize natural energy harvesting to optimize wind usage to generate a forward thrust; and
    (g) changing said rotational speed of each Flettner rotor of said plurality of Flettner rotors to maximize natural energy harvesting to optimize wind usage to generate a forward thrust based on the calculations in step (f).

2. The process of claim 1, wherein said plurality of Flettner rotors comprises four Flettner rotors.

3. The process of claim 2, wherein said plurality of Flettner rotors are positioned in a rectangular pattern on said marine vessel.

4. The process of claim 1, wherein one or more Flettner rotors of said plurality of Flettner rotors at rotates different rotational speeds and in different rotational directions.

5. The process of claim 1, wherein said plurality of sensors for detecting natural energy sources comprises a wind sensor, a solar sensor, a wave sensor, and a vessel speed sensor.

6. The process of claim 1, wherein said marine vessel further comprises a said.

7. The process of claim 1, wherein said energy storage bank is a battery bank.

8. The process of claim 1, wherein said energy storage bank is a fuel cell.

9. The process of claim 1, wherein said propeller is operable as a turbine to generate electricity.

10. The process of claim 1, wherein said propeller operable to propel said marine vessel.

* * * * *